United States Patent [19]

Heidelberg

[11] 4,217,829
[45] Aug. 19, 1980

[54] SYSTEM AND VEHICLE TO BE HELD MAGNETICALLY

[76] Inventor: Götz Heidelberg, Am Hügel 16, 8136 Starnberg-Percha, Fed. Rep. of Germany

[21] Appl. No.: 886,767

[22] Filed: Mar. 15, 1978

[30] Foreign Application Priority Data

Mar. 18, 1977 [DE] Fed. Rep. of Germany ....... 2711994

[51] Int. Cl.² ............................................. B61B 13/08
[52] U.S. Cl. ................................................... 104/281
[58] Field of Search ............... 104/148 MS, 148 LM, 104/148 SS, 23 FS; 308/10; 310/12, 13

[56] References Cited

U.S. PATENT DOCUMENTS

| | | | |
|---|---|---|---|
| 3,626,858 | 12/1971 | Colling et al. | 104/148 LM |
| 3,638,093 | 1/1972 | Ross | 104/148 MS X |
| 3,680,489 | 8/1972 | English | 104/23 FS X |
| 3,783,794 | 1/1974 | Gopfert et al. | 104/148 MS |
| 3,899,979 | 8/1975 | Godsey, Jr. | 104/148 MS |
| 4,029,020 | 6/1977 | Nakamura et al. | 104/148 MS |
| 4,055,123 | 10/1977 | Heidelberg | 104/148 MS |

FOREIGN PATENT DOCUMENTS

| | | |
|---|---|---|
| 526401 | 6/1931 | Fed. Rep. of Germany . |
| 643316 | 4/1937 | Fed. Rep. of Germany . |
| 2339060 | 2/1975 | Fed. Rep. of Germany . |
| 2342734 | 4/1975 | Fed. Rep. of Germany ... 104/148 MS |
| 2426053 | 12/1975 | Fed. Rep. of Germany ... 104/148 MS |
| 2551051 | 5/1977 | Fed. Rep. of Germany . |
| 37412 | 3/1976 | Japan . |

Primary Examiner—Randolph A. Reese
Attorney, Agent, or Firm—Spencer & Kaye

[57] ABSTRACT

A vehicle has a compartment joined to a carrier by springs. An attracting magnetic device has a first part (e.g. a ferromagnetic travelling field stator) mounted on a roadway, and a second part (e.g. spaced permanent magnets forming a synchronous linear motor in combination with the stator) mounted on the carrier. The two parts of the magnet device lie opposite one another to leave an air gap therebetween and so to hold the vehicle in spaced relation to the roadway. An additional-force device is mounted to act between the vehicle and the roadway and supplements the force of the magnetic attraction to make up the holding force needed to maintain the vehicle in the desired position relative to the roadway. The part of the magnetic device that is mounted on the vehicle can be displaced relative to the additional-force device to vary the width of the air gap and thereby vary the force of the magnetic attraction. Such displacement can be caused by a device responsive to variations in distance between the vehicle compartment and the carrier on compression or expansion of the springs.

29 Claims, 6 Drawing Figures

SYSTEM AND VEHICLE TO BE HELD MAGNETICALLY

FIELD OF THE INVENTION

The invention relates to a system operating at least partly by magnetic attraction for maintaining a vehicle in spaced relation to a roadway with the aid of an attracting magnetic device which comprises a first part mounted on the roadway and a second part lying opposite the first part and leaving a free gap.

BACKGROUND TO THE INVENTION

A system working with attracting magnetic forces is in itself unstable. In an assumed state 1, for example, with a given gap width the magnetic holding force supplied by the magnetic device is exactly so great that it is in equilibrium with external forces acting on the vehicle. If the external forces acting on the vehicle should now vary, in an assumed state 2, the magnetic holding force supplied by the magnetic device is then either too great or too small, so that the gap might disappear or an unhindered increase of its size might occur. For this reason an additional-force device acting between the roadway and the vehicle is provided which supplies the necessary force difference between the magnetic holding force of the magnetic device and the total holding force required in consequence of the external load. In this way the gap between the first part and the second part of the magnetic device is kept at a determined magnitude or within a determined range of magnitudes.

Preferred additional-force devices are wheels and/or electromagnets, particularly electromagnets whose magnetic force is variable. However, it is also possible to provide repelling permanent magnets, air cushions, sliding devices, electrodynamic repulsion, and the like. The forces supplied by the additional-force device may be so directed that they assist the attracting magnetic forces, counteract them, or act in both these directions. When wheels are used for example as additional-force devices the action can be applied in both directions by two rolling surfaces on opposite sides of the wheels or by means of wheels which are supported in one direction on a rail, in conjunction with wheels which are supported in the other direction on the same rail or on another rail.

For the purpose of the invention, by the expression "holding a vehicle in relation to the roadway" is understood: substantially vertical holding relative to forces acting substantially vertically, for example the weight of the vehicle including the pay load, inertia forces, disturbing forces; and/or substantially horizontal holding in relation to forces acting substantially horizontally, for example inertia forces on bends, wind forces, other disturbing forces; and/or holding against any other forces which could bring the vehicle out of the intended relative position with respect to the roadway. The holding of the vehicle in relation to the roadway should be effected in such a manner that the gap width between the first part and the second part of the magnetic device remains within a determined range.

If the external forces acting on the vehicle can vary very considerably in magnitude, for example when changing over from an unladen vehicle to a fully laden vehicle, it is advantageous for the gap width between the first part and the second part of the magnetic device to be adapted to the external forces at the moment in question or to the total holding power required at the moment in question, in order that only the lowest possible additional force would have to be supplied by the additional-force device. If external forces are high it will thus be attempted to reduce the width of the gap, while with lower external forces an enlargement of the gap width is advantageous.

BRIEF STATEMENT OF THE INVENTION

According to the invention an at least partly magnetically operating system is provided for holding a vehicle in relation to a roadway with the aid of an attracting magnetic device which comprises a first part mounted on the roadway and a second part which lies opposite the first part, leaving a free gap, and which second part is fastened on a carrier part joined by a spring means to a compartment of the vehicle, while an additional-force device acting between the roadway and the vehicle is provided in order to make up the force difference between the magnetic holding force of the magnetic device and the total holding force required, in which system the additional-force device carried by the carrier part is coupled to the vehicle compartment in such a manner that relative displacements permitted by the spring device between the vehicle compartment and the carrier part are converted into relative displacements between the second part of the magnetic device and the additional-force device, so that the width of the gap is automatically varied in dependence on the holding force required. The coupling of the additional-force device to the vehicle compartment may be equated with the elements for carrying this into effect, namely displacement means for displacing said second part of said magnetic device relative to said additional-force device thereby to vary the width of said free gap, and responsive means responsive to displacement enabled by said spring means of said compartment relative to said carrier part to cause said displacement by said displacement means.

In the system of the invention because of the spring means variations of the external forces lead to relative displacements between the vehicle compartment and the carrier part. These relative displacements are automatically converted into relative displacements between the second part of the magnetic device and the additional-force device, so that the width of the gap is adapted in the required direction to the external forces or to the holding force required at the moment in question. By reason of the coupling, in accordance with the invention, of two relative displacement paths, the required minimization of the force to be supplied by the additional force device is achieved in a particularly simple and reliable manner. The coupling can be effected in a particularly advantageous manner by mechanical or hydraulic connecting means, in which case electronic transmission and control devices can be dispensed with. Since the relative displacements which are to be produced, according to the invention, between the second part of the magnetic device and the additional-force device are generally relatively small (in practice the range of gap width between the first part and the second part of the magnetic device is usually about 5 to 25 mm), the relative displacement between the vehicle compartment and the carrier part is preferably converted into a reduced relative displacement between the second part of the magnetic device and the additional-force device. In some embodiments of the invention an increase of the force, in line with the reduction of the relative displacement, for the purpose of varying the distance between the second part of the magnetic device and the additional-force device is advantageous or necessary for the force balance of the system.

The spring characteristic of the spring means is preferably adapted to the desired relative displacements between the second part of the magnetic device and the additional-force device when the required holding force varies. This adjustment can for example comprise selection of a suitable spring constant with a linear spring characteristic of the spring device, or the selection of an advantageous bias for the spring device, or the provision of a non-linear spring characteristic of the spring device in order to achieve improved adaptation to the force/gap-width characteristic of the magnetic device. This aspect of adjustment of the spring characteristic will be made clearer in the description of the embodiments given by way of example.

As a further development of the invention an adjusting device is provided for adjusting the relative position between the second part of the magnetic device and the additional-force device.. With the aid of this adjusting device it is possible on the one hand to effect a "basic setting" of a range of additional forces to be supplied by the additional-force device, while on the other hand the operation of this adjusting device may be controlled directly or indirectly by the force supplied by the additional-force device, for example through the force transmitted by the coupling connection.

The adjustment of the adjusting device is preferably effected with comparatively low frequency; in this case the relative displacements between the second part of the magnetic device and the additional-force device take place on the one hand, as a consequence of the coupling described, in accordance with the relative displacements between the vehicle compartment and the carrier part, and on the other hand with low frequency or quasi-stationarily with the aid of the adjusting device. This possibility is of particular importance with a level-regulated spring means. The adjusting device may for example be a mechanical or hydraulic device for adjusting the effective length of the coupling between the vehicle compartment and the additional-force device; it may however also be in the form of a hydraulic device for varying the amount of hydraulic fluid in a hydraulic coupling connection between the vehicle compartment and the additional-force device.

As a further development of the invention, brake blocks, which with the aid of the adjusting device described can be brought into braking engagement with corresponding surfaces on the roadway, may be provided on the carrier part.

As a rule the additional-force device comprises a plurality of individual additional-force devices along the vehicle, so that tilting of the vehicle is avoided. On the other hand, there are additional-force devices which supply additional forces distributed over a certain area, so that in these cases it is also possible in principle to manage with a single additional-force device for the vehicle.

The attracting magnets of the attracting magnetic device may be disposed on the vehicle and/or on the roadway. Mounting on the vehicle is preferred, since the roadway can then be constructed at lower cost. For the purpose of supplying the attractive magnetic forces it is preferable for permanent magnets to be used exclusively or in part. The attracting magnets generally co-operate with ferromagnetic parts constituting the other part of the magnetic device.

In a particularly preferred form of the system of the invention the first part of the magnetic device consists of a ferromagnetic travelling-field stator with a travelling-field winding inserted in transverse slots disposed along the travelling-field stator and spaced apart from one another, while the second part of the magnetic device comprises permanent magnets disposed along the vehicle and spaced apart from one another, the distance between the permanent magnets being adapted to the distance between the transverse slots, so that a synchronous linear motor is formed by the travelling-field stator and the permanent magnets. If the travelling-field stator carries a three-phase travelling-field winding, the spacing of the permanent magnets may be made equal to three times the spacing of the transverse slots.

The invention relates in addition to a vehicle which can be held in relation to a roadway with the aid of magnetic forces and which contains that part of the abovedescribed system which is associated with the vehicle.

SHORT DESCRIPTION OF THE DRAWINGS

Several preferred embodiments of the invention will now be described by way of example with reference to the accompanying drawings in which.

DESCRIPTION OF PREFERRED EMBODIMENTS

Figure 1:
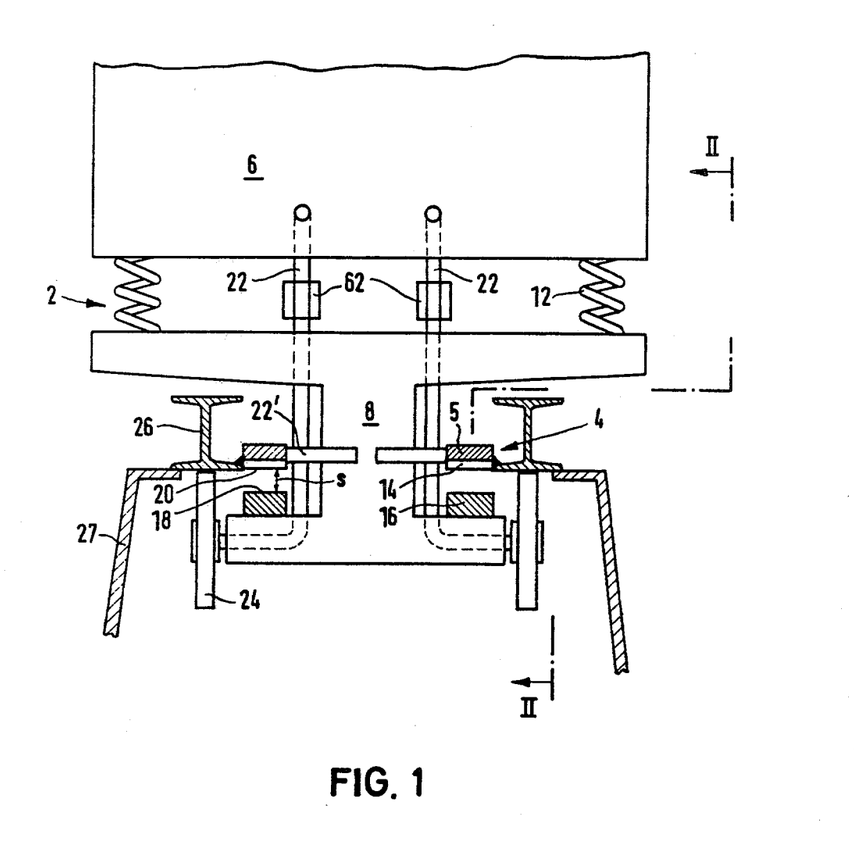
FIG. 1 is a front view of a part of a vehicle and also a cross-section through a roadway.
Figure 2:
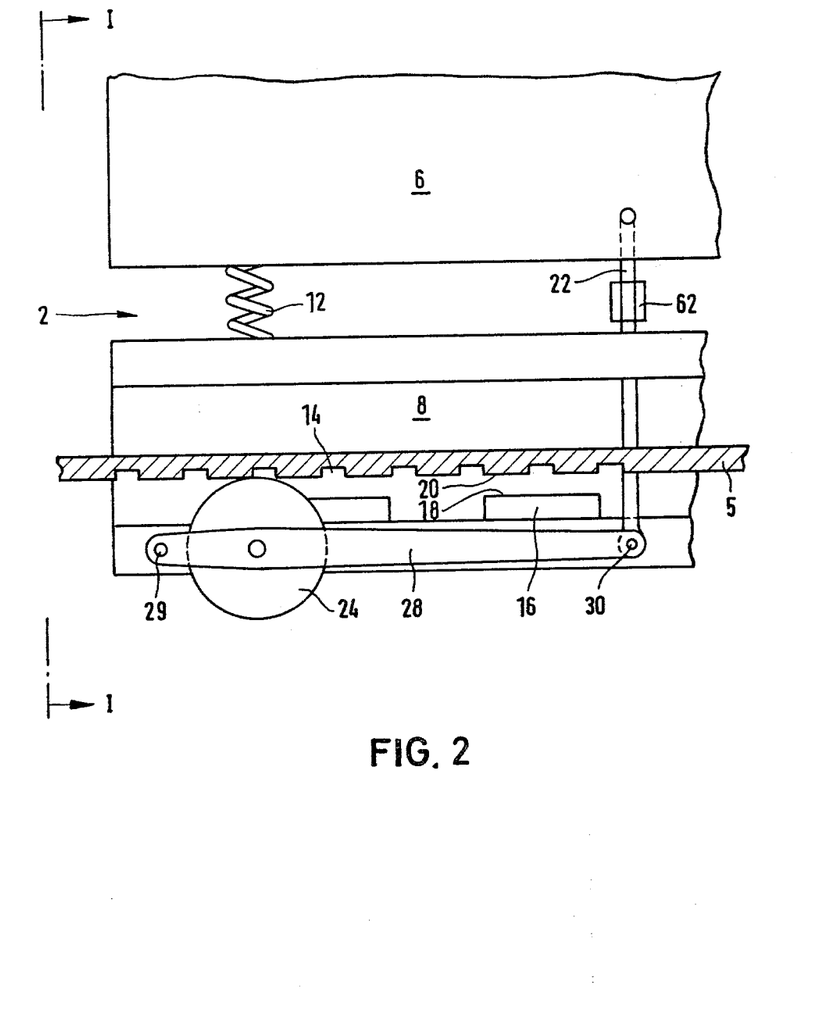
FIG. 2 is a side view, partly in section, of part of the vehicle shown in FIG. 1, with wheels as additional-force device, and also shows part of the roadway.

The vehicle 2 shown in FIGS. 1 and 2 comprises a vehicle compartment 6 and a carrier part in the form of a magnet carrier 8. The magnet carrier 8 has an approximately double-T-shaped cross-section, the upper flange of this cross-section being wider than the lower flange. The vehicle compartment 6 is supported by means of springs 12 on the magnet carrier 8. The magnet carrier 8 may extend over the entire length of the vehicle 2; however, it is peferable for two magnet carriers 8 to be provided along the vehicle 2, one magnet carrier 8 being disposed in each end region of the vehicle 2. The vehicle 2 is of substantially symmetrical construction in relation to its longitudinal center plane.

A roadway 4 is likewise of substantially symmetrical construction in relation to its longitudinal center plane and consists of two separate halves. Each half comprises a ferromagnetic travelling-field stator 5, extending in the longitudinal direction of the roadway 4, as first part of the magnetic device, this part having on its lower face slots 14 extending transversely to the longitudinal extent of the roadway 4. The slots 14 are disposed equal distances apart. On the outside of each travelling-field stator 5 is attached a rail-shaped carrier 26 of double-T-shaped cross-section, this carrier 26 likewise extending in the longitudinal direction of the roadway 4. The bottom surface of the carriers 26 is approximately at the same height as the bottom surfaces 20 of the travelling-field stators 5. The travelling-field stators 5 and the carriers 26 are together supported from the ground by a large number of spaced supports.

Facing the lower face of the travelling-field stators 5, permanent magnets 16 are disposed on the magnet carrier 8 to serve as second part of the magnetic device, these magnets being arranged in a row extending in the longitudinal direction of the roadway 4. The permanent magnets 16 are spaced apart at centers corresponding to three times the spacing of the slots 14. In the row of permanent magnets 16 the north and south poles facing the travelling-field stator 5 follow one another. Between the magnet pole surfaces 18 on the upper faces of the permanent magnets 16 and the lower face 20 of the travelling-field stator 5 there is an air-gap of gap width s.

On the outside of the bottom flange of the double-T-shaped cross-section of the magnet carrier 8 levers 28 are articulated on both sides by one end to a pivot 29. The other end of each of the levers 28 is connected by a link 22 to the vehicle compartment 6. The links 22 first extend inwards from the levers 28 and then inwardly of the travelling-field stators 5 through the upper region of the magnet carrier 8 and upwards to the vehicle compartment 6. The links 22 are articulated both to the vehicle compartment 6 and to the lever 28.

Between the pivot 29 and the end 30 of the lever 28 a wheel 24 is mounted for rotation on each lever 28. The axis of rotation of the wheel lies closer to the pivot 29 than to the end 30, for example so that a lever arm ratio of 1:5 is obtained.

The wheels 24 roll on the under side of the rail-shaped carriers 26. Along the length of the vehicle 2 at least two wheels 24 are provided on each side. If the magnet carrier 8 is subdivided into a plurality of partial magnet carriers over the length of the vehicle 2, two wheels 24 are preferably provided on each side for each partial magnet carrier.

The vehicle compartment 6 and the magnet carrier or carriers 8 are connected together not only by means of the springs 12 but also by suitable links (not shown) which permit inward and outward deflection of the vehicle compartment 6 but nevertheless guide the magnet carrier or magnet carriers 8 in relation to the vehicle compartment 6.

In addition, further wheels 22' having vertical axes of rotation are mounted on the magnet carrier, these wheels rolling on the inner side surfaces of the travelling-field stators 5 and thus taking over the lateral guiding of the vehicle 2.

The magnetic arrangement of the system seen as a whole is such that the attracting permanent magnets 16 between them always supply an attracting force which is greater than the total carrying force required. For compensating purposes the wheels 24 supply a downwardly directed additional force, so that equilibrium prevails between the downwardly directed forces (weight of vehicle compartment, pay load, and magnetic carrier and downwardly directed wheel force) and the upwardly directed magnetic force. These foces can in addition have superimposed on them forces due to mass and any other disturbing forces; the wheels 24 however compensate for such variations of the total holding force required by varying the forces supplied by them.

If the wheels 24 are fastened rigidly on the magnet carrier 8, the gap width s between the areas 18 and 20 must be selected so that even the maximum holding force ever required can be compensated by the magnet force alone. The lower the holding force required, the greater will be the forces to be supplied by the wheels 24. Particularly with a low pay load, these forces thus become very great.

Figure 3:
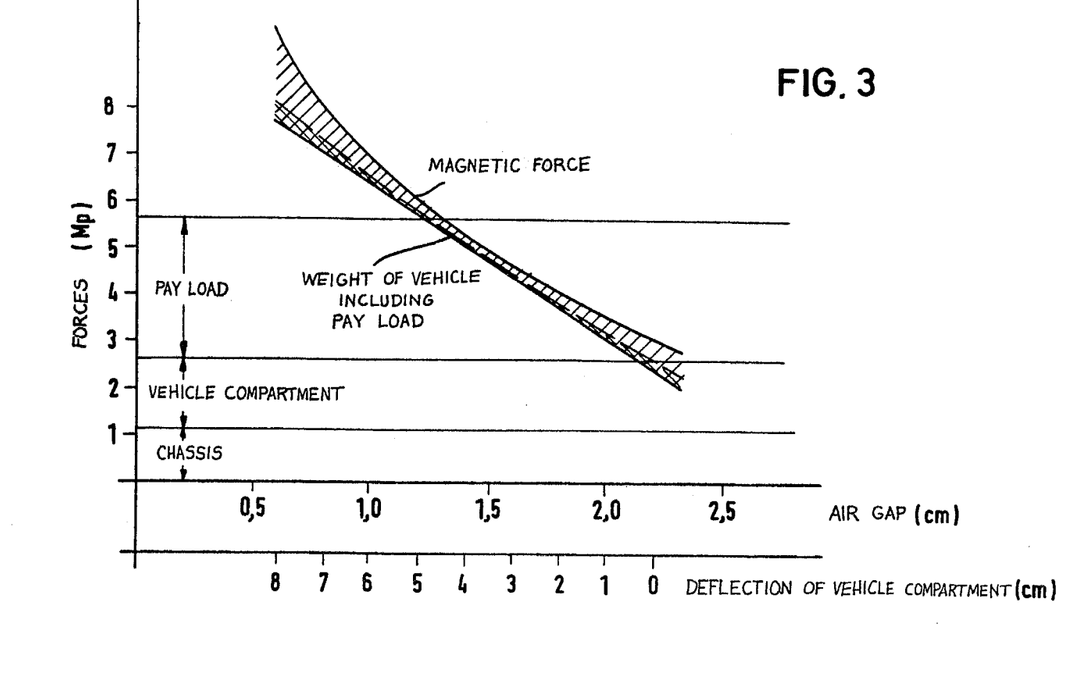
FIG. 3 is a diagram in which the force/gap-width characteristic of the attracting magnet device and the force/deflection diagram of the spring device are plotted.

With the aid of the diagram given in FIG. 3 the conditions for the automatic adjustment of gap width according to the invention will now be described more closely. The upper curve in the diagram represents the force/gap-width characteristic of the permanent magnets 16. The lower curve in the diagram is a straight line and represents the force/deflection curve of the spring or of all the springs 12. By selecting springs of suitable hardness, a suitable length adjustment of the link 22 and therefore advantageous "basic setting" of the gap width s for a determined load, and suitable selection of the lever arm length ratios of the lever 28, and so on, the spring characteristic in the diagram shown in FIG. 3 can be shifted from the bottom or left to a position near that of the magnet characteristic. For safety a spacing should however be maintained between the two curves, in order to ensure that the wheels 24 will not lift off the carriers 26 in the downward direction.

If starting from an initial state, the pay load of the vehicle compartment 6 is for example increased, the springs 12 will be more highly compressed and on the spring characteristic curve there will be a movement from bottom right to upper left. Because of the mechanical coupling of the change in deflection of the spring 6 to a change in position (approximately in the vertical direction) of the wheels 24 in relation to the magnet carrier 8, this automatically results in a reduction of the gap width s. Consequently, after this transition the system no longer works with the starting gap width but works with a smaller gap width, so that a greater magnetic force is obtained.

The conditions described are modified by the fact that the change in deflection of the spring or springs 12 connected in parallel does not soley depend on the variation of the pay load, because a fraction of the wheel force, depending on the lever length ratios of the lever 28, additionally compresses the springs 12 by way of the link 22. This has the consequence that the additional force to be supplied by the wheels 24 is further reduced. This is illustrated in the diagram shown in FIG. 3 by the curve which lies between the magnetic force characteristic and the spring characteristic. This curve is always produced in the same ratio, for example in the ratio of 1:6, 1:5, or 1:4, depending on the lever arm length ratio, by subdividing the respective vertical distances between the magnetic force characteristic and the spring force characteristic. Thus, as the final result, the wheels 24 have to supply only an additional force which at any given time corresponds to the vertical distance between the magnetic force characteristic and the curved line lying under the latter. From the diagram in FIG. 3 it is clear that the invention provides an automatic substantial reduction of the additional force which has to be supplied by the wheels. If in fact the wheels 24 were fastened rigidly on the magnet carrier 8 and a gap width of for example 1 cm were set in order to ensure high carrying capacity of the vehicle, the wheels would have to supply the entire force difference between about 7 tons and the holding force necessary at any given moment, which for example with an empty vehicle would amount to total wheel forces of about 4.5 tons. Instead, with the arrangement according to the invention only a fraction of this wheel force is now required.

In the embodiment described above, the wheels 24 are so arranged that they apply forces to the vehicle only in one direction, namely in the downward direction. If it is considered that wheel forces in two directions are advantageous, for example in order to prevent the wheels from lifting off their track as the result of influences of any kind, which will not be more fully described here, or for example in magnetic force arrangements in which wheel forces are required in one direction or the other depending on the holding force needed, an additional rail-like carrier may be provided on the opposite side of the wheels to that where the rail-like carrier 26 is disposed. An arrangement of the wheels in pairs, in which one wheel rolls on the upper side of the carrier 26 and one on the under side of the latter, is also possible. Finally, wheels intended to supply forces in the opposite direction to the wheels 24 described, can be arranged to run on a separate carrier.

In the embodiment described above the additional-force device is in the form of wheels. Other possible arrangements have been mentioned in the preamble to the description. In particular, electromagnets may also be used for this purpose. The additional-force devices are generally held in a determined relative position with respect to the coacting element with which they cooperate. In the case of wheels this is achieved automatically through the running of the wheels, while in the case of electromagnets a substantially constant distance from the coacting surface can be obtained for example by suitable control of the coil current. If the additional-force device is in the form of magnets, completely magnetic, contactless holding of the vehicle within a distance range with respect to the roadway is achieved.

Figure 4:
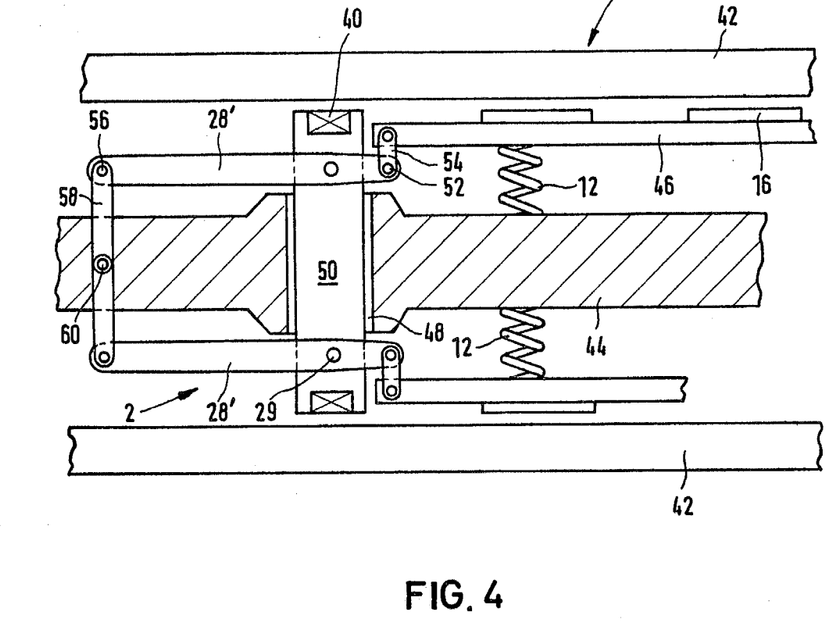
FIG. 4 is a plan view, partly in section, of a side guide of a vehicle with electromagnetic additional-force device.

With the aid of FIG. 4 an embodiment utilizing electromagnets as the additional-force device will now be described. This example relates to the guiding of a vehicle in such a manner that the latter is held substantially in the horizontal direction within a determined range of distances with respect to the roadway. The part of the roadway 4 of interest here comprises a track channel 42 in the form of two ferromagnetic rails disposed a determined distance from one another. A longitudinal bearer 44 of the vehicle 2 projects from above into this track channel. Spaced apart laterally from the longitudinal bearer 44 there is disposed on each side a magnet bar 46, these magnet bars being connected by springs 12 to the longitudinal bearer 44. Each magnet bar 46 is provided with permanent magnets 16 disposed in a row and with alternating polarity, each of these magnets cooperating with the facing surface of the ferromagnetic rail 42. In accordance with the definitions given in connection with the embodiment shown in FIGS. 1 and 2 the longitudinal bearer 44 belongs to the vehicle compartment and the magnet bar 46 corresponds to the magnet carrier 8.

A transverse bearer 50 is disposed in a cross-bore 48 in the longitudinal bearer 44 so as to be movable substantially horizontally and transversely to the longitudinal bearer 44. Electromagnets 40 are disposed in the end faces of the cross-bearer 50. In addition, two levers 28' extend in the longitudinal direction roughly parallel to the longitudinal bearer 44, each of these levers being fastened for rotation at a pivot 29 on the cross-bearer 50. From the end 52 of a shorter lever arm a link 54 extends to the respective magnet bar 46 associated therewith; from the end 56 of a longer lever arm there extends in each case on the other side of the pivot 29 a link 58 leading to a connection 60 on the longitudinal bearer 44, this connection 60 being common to both the levers 28.

If the longitudinal bearer 44, which forms part of the vehicle 2, is now moved towards one of the ferromagnetic rails 42, a spring 12 is compressed. This variation of the displacement acts on the associated magnet bar 46 by way of the link 58, lever 28, and link 54, and that magnet bar is moved away from the associated ferromagnetic rail 42 by a shorter distance than corresponds to the variation of displacement of the spring 12. Consequently, lower magnetic attraction is produced on this side of the track channel and the longitudinal bearer 44 moves back towards the center of the track channel. Thus the electromagnets no longer have to effect the entire control for taking lateral forces on the longitudinal bearer 44, but once again only relatively small additional forces have to be supplied by the electromagnets 40. Furthermore, the entire arrangement is symmetrical to the longitudinal center plane of the track channel 42, so that the effects are in addition superimposed on both sides of the longitudinal bearer 44.

In the embodiment shown in FIGS. 1 and 2 adjusting devices 62 are provided in the links 22 are adjusting the effective length of the link between the vehicle compartment 6 and the end 30 of the lever 28. These devices may for example comprise a nut which cooperates with two oppositely directed screwthreads on the ends of the link 22, which is divided at this point. This purpose may also be served by a hydraulic piston and cylinder unit whose length is adjustable and which connects together an upper portion and a lower portion of the link 22. Adjusting devices, such as the adjusting device 62, may also be provided in the levers 28 for the purpose of adjusting the lever arm length, in addition to or instead of those provided in the links.

With the aid of FIG. 5 one possible way of controlling the respective adjusting device 62 by means of the force transmitted by the link 22 will now be described more fully. The upper portion 22a of the link 22 is articulated at its upper end on a vertical pin 66 provided with an external screwthread 64. The pin 66 projects into a gearbox casing 68. The gearbox casing 68 contains a gear 70 adapted to rotate about a vertical axis and mounted in the axial direction. The gear 70 has in a central bore an internal screwthread which cooperates with the screwthread 64 on the pin 66. The gear 70 can be turned in both directions with the aid of a pinion 72 mounted on the shaft of an electric motor 74. Rotation of the pinion 72 thus raises or lowers the pin 66 and thus the upper portion 22a of the link 22.

The upper portion 22a of the link 22 is connected to the lower portion 22b of the link 22 by way of a longitudinal force switch 76. The longitudinal force switch 76 has a casing 78 to which the lower portion 22b is connected. At the lower end of the upper portion 22a a disc 80 is provided which can be moved upwards and downwards against the action of a spring 82 disposed between the disc 80 and a top cover 84 of the casing 78. The cover 84 is screwed into the casing 78 so that the initial stress of the spring 82 is adjustable. The bottom 86 of the casing 78 forms a bottom stop for the disc 80, while a bush 88 screwed into the cover 84 constitutes by its bottom end an adjustable upper stop for the disc 80.

The upper portion 22a of the link 22 carries a lateral extension 90 which can cooperate with an upper electric switch 92 and a lower electric switch 94. When the longitudinal force in the link 22 reaches a determined value fixed by the prestressing of the spring 82, the upper switch 92 is closed and thus the motor 74 is operated in the direction of rotation which results in the raising of the pin 66. The wheel 24 is thus also moved upwards and the gap width s is increased, so that the wheel 24 supplies a reduced additional force and the longitudinal force in the link 22 decreases. If the longitudinal force in the link 22 falls below a predetermined minimum value, the bottom switch 94 is closed and the motor 74 operated in the opposite direction of rotation.

In order that the height of the pin 66 shall not be constantly adjusted when dynamic longitudinal force fluctuations occur in the link 22, the upper portion 22a of the link 22 is connected to the lower portion 22b of the link 22 by way of a damper 96. The same result can also be achieved with electric time delay elements between the switches 92,94 and the motor 74. The vertical displacement of the pin 66 should in fact take place only when there are fluctuations of load of relatively long duration, for example when a change of the pay load of the vehicle compartment occurs, or on the outer side of a long bead.

Figure 6:
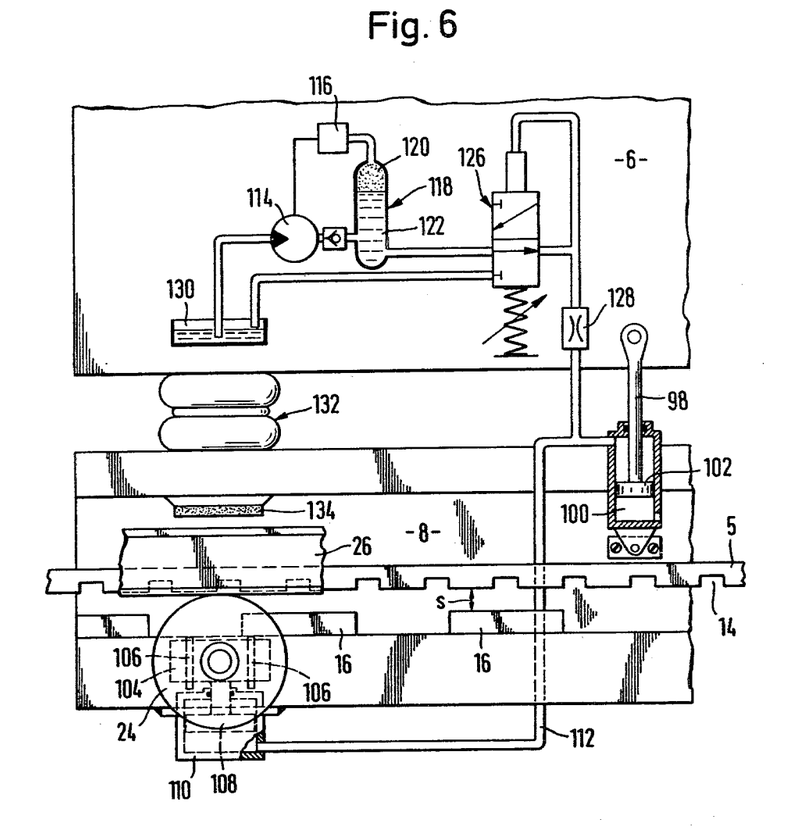
FIG. 6 illustrates a hydraulic connection between a vehicle compartment and the additional-force device and also an adjusting device for maintaining a constant pressure in the hydraulic connection.

FIG. 6 illustrates a possible way of hydraulically coupling the relative displacement between the vehicle compartment 6 and the magnet carrier 8 to the relative displacement between the wheel 24 and the permanent magnets 16. For this purpose a piston rod 98 is articulated on the vehicle compartment and a cylinder 100 on the magnet carrier 8. A piston 102 on the bottom end of the piston rod 98 slides sealingly in the piston 100. The bearing support 104 of the wheel 24 is guided in the vertical direction by means of the vertically extending ribs 106. The bearing support 104 is carried by a piston 108 adapted to slide in the vertical direction sealingly in a cylinder 110. The pressure chamber of the cylinder, located under the piston 108, is connected by a hydraulic pipe 112 to the pressure chamber of the cylinder 100, located above the piston 102. When the vehicle compartment 6 drops with respect to the magnet carrier 8, the pressure chamber of the cylinder 100 is enlarged. Consequently the pressure chamber of the cylinder 110 is reduced in size, so that the wheel 24 is lowered in relation to the magnet carrier 8 and therefore in relation to the permanent magnets 16. Consequently the magnet gap s is reduced in size and the magnetic holding force is increased in the desired manner. The pressure area of the piston 108 is substantially larger than the pressure area of the piston 102, for example between three and ten times as great, so that a relative displacement between the vehicle compartment 6 and the magnet carrier results in a reduced relative displacement between the wheel 24 and the permanent magnet 16. The device described is provided on both sides of the vehicle 2.

In the embodiment illustrated in FIG. 6 an adjusting device is additionally provided by which the amount of hydraulic fluid in the hydraulic connection between the cylinder 110 and the cylinder 100 can be variedso that the pressure remains approximately constant. For this purpose a hydraulic pump 114 is provided, which under the control of a control device 116 always maintains an approximately constant pressure in a pressure accumulator 118. The upper portion 120 of the pressure accumulator 118 is filled with gas, while the lower portion 122 is filled with hydraulic fluid. When the pressure in the hydraulic pipe 112 falls below a determined value, a valve 126 is opened and hydraulic fluid flows out of the accumulator 118 through a throttle valve 128 into the hydraulic pipe 112. If on the other hand the pressure in the hydraulic pipe 112 rises above a predetermined pressure, the valve 126 is reversed so that hydraulic fluid can flow out of the hydraulic pipe 112 into a tank 130. The pump 114 draws its hydraulic fluid out of the tank 130. Through adjustment of the reversing pressure of the valve 126 and with the aid of the throttle valve 128 the effect can be achieved that high-frequency variations of pressure in the hydraulic pipe 112 will not immediately lead to the introduction or discharge of hydraulic fluid into or from the hydraulic pipe 112. The adjusting device 114 to 130 can also be used in the embodiment shown in FIGS. 1 and 2, the pressure in a piston and cylinder unit (not shown), which connects an upper portion and a lower portion of the link 22 to one another and thus determines the effective length of the link 22, being kept constant.

Figure 5:
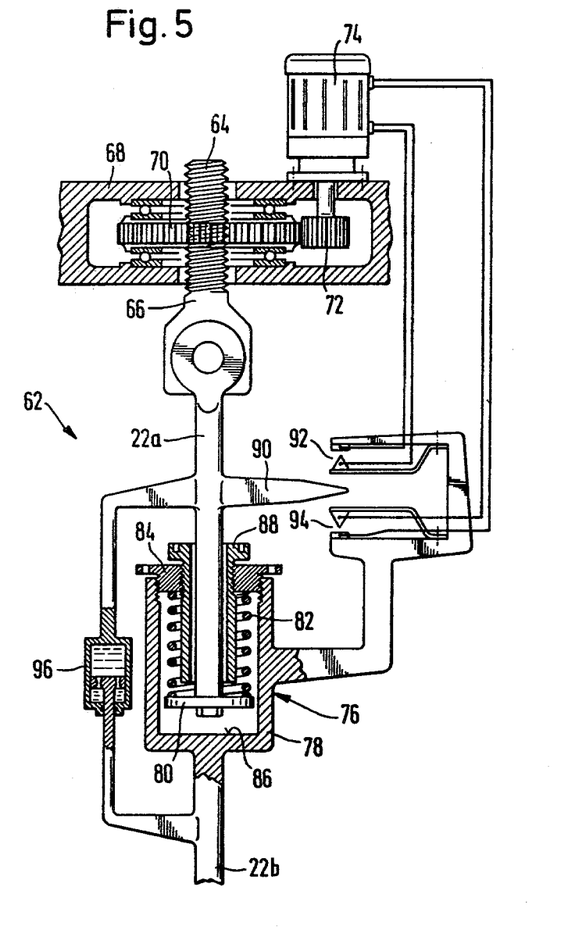
FIG. 5 shows an adjusting device for adjusting the effective length of a link between a vehicle compartment and the additional-force device.

Both in the embodiment shown in FIG. 5 and in that shown in FIG. 6 the desired low-frequency minimization of the additional force supplied by the wheel 24 is achieved. Acquisition of information as to whether adjustment is necessary and also the adjustment operation itself are effected directly in the coupling between the relative displacement between the vehicle compartment 6 and the magnet carrier 8 and the relative displacement between the additional-force device and the second part of the magnetic device in the form of permanent magnets 16, so that only small adjusting forces have to be provided.

In the embodiment shown in FIG. 6 a bellows 132 filled with gas under pressure is provided as spring device. (A hydro-pneumatic spring device could be used in place of the bellows 132). The bellows 132 is supplied with pressure by a compressor (not shown). For the bellows 132 it is also possible to provide a level regulating device (not shown) which starting from a determined vertical compression or from a determined vertical expansion of the bellows 132 supplies gas under pressure into the bellows 132 or discharges gas under pressure from the latter. From this embodiment it is particularly clear that the direct hydraulic coupling between the relative displacement between the vehicle compartment and the magnet carrier 8 and the relative displacement between the wheel 24 and the permanent magnets 16 supplies the coupling for relatively high-frequency forces, whereas relatively low-frequency or quasi-stationary variations of the necessary holding force are taken into account through the replenishment or discharge of hydraulic liquid in the hydraulic pipe 112. Since the level regulation for the bellows 132 also works at relatively low frequency, for example with a refilling time in the range of from 5 to 20 seconds, the high-frequency coupling through the piston and cylinder unit 100, 102 and 108, 110 is useful.

It should be pointed out that information as to when the setting should be varied can also be supplied for the adjusting device on the basis of the state of loading of the spring means 12 or 132, for example by means of a force pickup under the spring 12 or by means of a pressure sensor on the bellows 132. By means of a suitable hydraulic metering device controlled by the spring force, it is then possible to pump into or out of the hydraulic device 112 the necessary amount of hydraulic fluid. Similarly, by means of the measurement of force or measurement of pressure on the spring means it would also be possible to control a motor, similar to the motor 74 (FIG. 5), for adjusting the effective length of the link 22, or to control the amount of hydraulic fluid in a piston and cylinder unit determining the effective length of the link 22.

The adjusting device 62 or the adjusting device 114 to 130 can also be used for operating a brake. A possible arrangement of this kind is shown in FIG. 6. On the upper flange of the magnet carrier 8 a brake block 134 is fastened. When sufficient hydraulic fluid has been pumped into the hydraulic pipe 112, the magnet carrier 8 is moved downwards until the brake block 134 comes into frictional contact with the upper face of the carrier 26. The same result can be achieved by lowering the pin 66 sufficiently by means of the motor 74 or by sufficiently increasing the effective length of the link 22 in some other way. The brake block 134 is disposed at a height such that when it comes into frictional engagement with the upper face of the carrier 26 the gap width s is relatively large, so that the attracting force of the magnetic device 5, 16 does not substantially reduce the braking pressure force and practically the entire weight of the vehicle 2 is available for applying pressure to the brake block 134. Preferably several brake blocks 134 are disposed along the magnet carrier 8.

Since the above described adaptation, or a combination of the two adaptations of the gap width s to the necessary holding force is or are effected separately on the two sides of the vehicle 2, it or they will also come into action when the vehicle 2 tilts to one side when travelling along a bend.

If the magnet carrier 8 is subdivided into a plurality of partial magnet carriers along the vehicle 2, provision can also be made for the partial magnet carriers to swivel after the style of a bogie, wheels such as wheels 22' effecting the alignment of the partial magnet carriers on bends.

What is claimed is:

1. A system operating at least partly by magnetic attraction for maintaining a vehicle in spaced relation to a roadway, said system comprising: a roadway, a vehicle, said vehicle having a compartment and a carrier part, and spring means joining said compartment and said carrier part, an attracting magnetic device having a first part and a second part, said first part being mounted on said roadway and said second part being mounted on said carrier part, and said first part and said second part being mounted so as to lie opposite one another and to leave a free gap therebetween, an additional-force device mounted on said carrier part to act between said carrier part and said roadway to supplement the force provided by said magnetic attraction to the extent necessary to make up the holding force required to maintain said vehicle in said spaced relation, a first piston and cylinder unit mounted between said compartment and said carrier part and adapted to be compressed and extended by displacements of said compartment relative to said carrier part enabled by said spring means, a second piston and cylinder unit mounted between said additional-force device and said carrier part to displace said second part of said magnetic device relative to said additional-force device thereby to vary the width of said free gap, an hydraulic connection interconnecting said first piston and cylinder unit with said second piston and cylinder unit, whereby said displacements of said compartment relative to said carrier part are positively converted into displacements of said second part of said magnetic device relative to said additional-force device thereby to reduce the supplementary force to be exerted by said additional-force device.

2. A system as claimed in claim 1 further comprising an adjusting device arranged to adjust the position of said second part of said magnetic device relative to said additional-force device, and wherein said adjusting device comprises hydraulic means for varying the quantity of hydraulic fluid in said hydraulic connection interconnecting said first piston and cylinder unit with said second piston and cylinder unit.

3. A system operating at least partly by magnetic attraction for maintaining a vehicle in spaced relation to a roadway, said system comprising: a roadway, a vehicle, said vehicle having a compartment and a carrier part, and spring means joining said compartment and said carrier part, an attracting magnetic device having a first part and a second part, said first part being mounted on said roadway and said second part being mounted on said carrier part, and said first part and said second part being mounted so as to lie opposite one another and to leave a free gap therebetween, an additional-force device, said additional-force device being mounted on said carrier part to act between said carrier part and said roadway to supplement the force provided by said magnetic attraction to the extent necessary to make up the holding force required to maintain said vehicle in said spaced relation, a lever articulated on said carrier part, said lever connecting said carrier part and said additional-force device such that by pivotal movement of said lever, said second part of said magnetic device is displaced relative to said additional-force device, thereby to vary the width of said free gap, mechanical connecting means connecting an arm of said lever and said compartment whereby displacements of said compartment relative to said carrier part enabled by said spring means are positively converted into displacements of said second part of said magnetic device relative to said additional-force device thereby to reduce the supplementary force to be exerted by said additional-force device.

4. A system as claimed in claim 3 further comprising an adjusting device arranged to adjust the position of said second part of said magnetic device relative to said additional-force device, and wherein said adjusting device comprises mechanical means for adjusting the effective length of said mechanical connecting means between said additional-force device and said vehicle compartment.

5. A system as claimed in claim 3 further comprising an adjusting device arranged to adjust the position of said second part of said magnetic device relative to said additional-force device, and wherein said adjusting device comprises hydraulic means for adjusting the effective length of said mechanical connecting means between said additional-force device and said vehicle compartment.

6. A system as claimed in claim 3 further comprising an adjusting device arranged to adjust the position of said second part of said magnetic device relative to said additional-force device, and wherein said adjusting device is controlled by the force transmitted by said mechanical connecting means.

7. A system as claimed in claim 1 or 3 wherein said spring means has spring characteristics adapted to the relative displacements between said second part of said magnetic device and said additional-force device that are desired in dependence upon variations in the required holding force.

8. A system as claimed in claim 1 or 3 further comprising an adjusting device arranged to adjust the position of said second part of said magnetic device relative to said additional-force device.

9. A system as claimed in claim 8 wherein said adjusting device is controlled by the force transmitted by said spring means.

10. A system as claimed in claim 8 further comprising at least one brake block fastened to the carrier part and wherein said adjusting device additionally to adjusting the position of said second part of said magnetic device also serves to move said brake block to cause and release braking action.

11. A system as claimed in claim 1 or 3 wherein said additional-force device includes wheels.

12. A system as claimed in claim 1 or 3 wherein said additional-force device includes electromagnets whose magnetic force is variable.

13. A system as claimed in claim 1 or 3 comprising a plurality of additional-force devices, at least two of said additional-force devices being disposed at locations spaced apart longitudinally with respect to said vehicle.

14. A system as claimed in claim 1 or 3 wherein said second part of said magnetic device comprises a plurality of spaced attracting permanent magnets.

15. A system as claimed in claim 14 wherein said first part of said magnetic device comprises a ferromagnetic travelling-field stator, said stator having spaced transverse slots and a travelling-field winding inserted in said slots; and wherein the spacing of said permanent magnets is adapted to the spacing of said slots of said stator whereby a synchronous linear motor is formed by the combination of said stator and said permanent magnets.

16. A vehicle to be maintained in spaced relation to a roadway at least partly by magnetic attraction, said vehicle comprising: a vehicle compartment, a carrier part, spring means joining said compartment and said carrier part, a magnetic device mounted on said carrier part, an additional-force device carried by said carrier part, a first piston and cylinder unit being mounted between said compartment and said carrier part to be compressed and extended by displacements of said compartment relative to said carrier part enabled by said spring means, a second piston and cylinder unit mounted between said additional-force device and said carrier part to displace said magnetic device relative to said additional-force device, an hydraulic connection interconnecting said first piston and cylinder unit with said second piston and cylinder unit, whereby said displacements of said compartment relative to said carrier part are positively converted into displacements of said magnetic device relative to said additional-force device thereby to adapt the distance between said magnetic device and said additional-force device to the force required for maintaining the vehicle in said spaced relation to said roadway.

17. A vehicle as claimed in claim 16 further comprising an adjusting device, arranged to adjust the position of said magnetic device relative to said additional-force device and wherein said adjusting device comprises hydraulic means for varying the quantity of hydraulic fluid in said hydraulic connection interconnecting said first piston and cylinder unit with said second piston and cylinder unit.

18. A vehicle to be maintained in spaced relation to a roadway at least partly by magnetic attraction, said vehicle comprising: a vehicle compartment, a carrier part, spring means joining said compartment and said carrier part, a magnetic device mounted on said carrier part, an additional-force device carried by said carrier part, a lever articulated on said carrier part, said lever connecting said carrier part and said additional-force device such that by pivotal movement of said lever, said magnetic device is displaced relative to said additional-force device, mechanical connecting means connecting an arm of said lever and said compartment, whereby displacements of said compartment relative to said carrier part enabled by said spring means are positively converted into displacements of said magnetic device relative to said additional-force device, thereby to adapt the distance between said magnetic device and said additional-force device to the force required for maintaining the vehicle in said spaced relation to said roadway.

19. A vehicle as claimed in claim 18 further comprising an adjusting device arranged to adjust the position of said magnetic device relative to said additional-force device and wherein said adjusting device comprises mechanical means for adjusting the effective length of said mechanical connecting means between said additional-force device and said vehicle compartment.

20. A vehicle as claimed in claim 18 further comprising an adjusting device arranged to adjust the position of said magnetic device relative to said additional-force device and wherein said adjusting device comprises hydraulic means for adjusting the effective length of said mechanical connecting means between said additional-force device and said vehicle compartment.

21. A vehicle as claimed in claim 18 further comprising an adjusting device arranged to adjust the position of said magnetic device relative to said additional-force device and wherein said adjusting device is controlled by the force transmitted by said mechanical connecting means.

22. A vehicle as claimed in claim 16 or 18 wherein said spring means has spring characteristics adapted to the relative displacements between said magnetic device and said additional-force device that are desired in dependence upon variations in the required holding force.

23. A vehicle as claimed in claim 16 or 18 further comprising an adjusting device, said adjusting device being arranged to adjust the position of said magnetic device relative to said additional-force device.

24. A vehicle as claimed in claim 23 wherein said adjusting device is controlled by the force transmitted by said spring means.

25. A vehicle as claimed in claim 23 further comprising at least one brake block fastened to the carrier part and wherein said adjusting device additionally to adjusting the position of said magnetic device also serves to move said brake block to cause and release braking action.

26. A vehicle as claimed in claim 16 or 18 wherein said additional-force device includes wheels.

27. A vehicle as claimed in claim 16 or 18 wherein said additional-force device includes electromagnets whose magnetic force is variable.

28. A vehicle as claimed in claim 16 or 18 comprising a plurality of additional-force devices, at least of two said additional-force devices being disposed at locations spaced apart longitudinally with respect to said vehicle.

29. A vehicle as claimed in claim 16 or 18 wherein said magnetic device comprises a plurality of spaced attracting permanent magnets.

* * * * *